United States Patent [19]

Maner et al.

[11] 3,943,121

[45] Mar. 9, 1976

[54] MONOAZO COMPOUNDS FROM 3-AMINOBENZISOTHIAZOLES AND SUBSTITUTED α-NAPHTHYLAMINE COUPLERS

[75] Inventors: Ronald J. Maner; Max A. Weaver, both of Kingsport, Tenn.

[73] Assignee: Eastman Kodak Company, Rochester, N.Y.

[22] Filed: Mar. 19, 1974

[21] Appl. No.: 452,893

Related U.S. Application Data

[63] Continuation-in-part of Ser. No. 260,083, June 6, 1972, abandoned.

[52] U.S. Cl.................................. 260/158; 260/156
[51] Int. Cl.$^2$.................... C09B 29/06; C09B 29/36

[58] Field of Search............................. 260/156, 158

[56] References Cited
UNITED STATES PATENTS

| 3,084,153 | 4/1963 | Fishwick et al.............. | 260/158 |
| 3,631,020 | 12/1971 | Weaver et al................ | 260/158 |

*Primary Examiner*—Charles F. Warren

[57] ABSTRACT

Monoazo compounds produce fast blue to green shades on polyester, nylon and cellulose acetate fibers and consist of a 2,1-benzisothiazole-3-yl diazo component and an α-naphthylamine coupling component, the nitrogen atom of which is monosubstituted with a cycloalkyl, aryl or substituted alkyl group.

6 Claims, No Drawings

MONOAZO COMPOUNDS FROM 3-AMINOBENZISOTHIAZOLES AND SUBSTITUTED α-NAPHTHYLAMINE COUPLERS

This invention concerns novel azo compounds consisting of certain benzisothiazole diazo components and α-naphthylamine coupling components. This invention also concerns synthetic polyamide fibers dyed with the novel azo compounds.

Our novel azo compounds have the general formula (1) 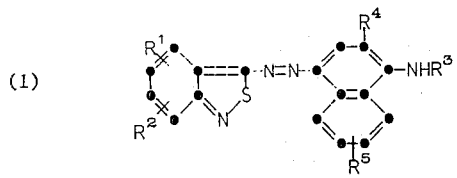

wherein
$R^1$ and $R^2$ each is hydrogen, lower alkyl, lower alkoxy, chlorine or bromine;
$R^3$ is cyclohexyl; lower alkyl cyclohexyl; aryl; alkyl of one to about six carbon atoms substituted with hydroxy, lower alkoxy, lower cyanoalkoxy, lower hydroxyalkoxy, cyano, halogen, aryl, aryloxy, cyclohexyl, lower alkylcyclohexyl, hydroxymethylcyclohexyl, $R^6$—CONHCH$_2$—cyclohexyl, $R^7$OOCNHCH$_2$-cyclohexyl, $R^7$SO$_2$N($R^8$)CH$_2$-cyclohexyl, pyrrolidinono, lower alkylpyrrolidinono, phthalimidino, —N($R^8$)CO—$R^6$, —NHCOO—$R^7$, —N($R^8$)SO$_2$R$^7$, —OOC—$R^6$, —COO—$R^7$, —CONR$^9$R$^{10}$, or

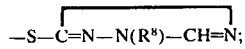

or —CH$_2$CH($R^{11}$)—[OCH$_2$CH($R^{11}$)]$_n$—$R^{12}$;
$R^4$ is hydrogen, lower alkyl or lower alkoxy; and
$R^5$ is hydrogen, lower alkyl, lower alkoxy, hydroxy, —NHCO—$R^6$, —NHCOO—$R^7$ or —NHSO$_2$—$R^7$; in which
$R^6$ is hydrogen; lower alkyl; lower alkyl substituted with halogen, hydroxy, lower alkoxy or aryl; aryl; lower alkylamino; or arylamino;
$R^7$ is lower alkyl;
$R^8$ is hydrogen or lower alkyl;
$R^9$ individually is hydrogen or lower alkyl;
$R^{10}$ individually is hydrogen or lower alkyl;
$R^9$ and $R^{10}$ in combination are pentamethylene or ethyleneoxyethylene;
$R^{11}$ is hydrogen or methyl;
$n$ is 1, 2 or 3; and
$R^{12}$ is hydrogen or hydroxy; and
each aryl is phenyl or phenyl substituted with lower alkyl, lower hydroxyalkyl, lower alkoxy, or halogen.

Our novel compounds produce unusual and unexpected bright, fast, blue to green shades on polyester, polyamide and cellulose ester fibers when applied thereto by conventional disperse dyeing techniques as compared to the corresponding benzothiazole dyes. Our azo compounds, in general, exhibit good dyeability as evidenced by levelness of dyeing, good build and fastness properties, such as light-fastness, wash fastness, gas fastness, resistance to sublimation and crockfastness. This combination of properties, including the desirable blue shades produced, distinguishes our novel compounds from structurally-similar compounds known in the prior art.

The substituents represented by $R^1$ through $R^5$ are well known in the art and can be derived from known intermediates according to published procedures. As used herein to describe an alkyl moiety, "lower" designates a carbon content of from one to about four. Preferably, $R^4$ and $R^5$ each is hydrogen and $R^3$ is —(CH$_2$)$_m$—$R^{13}$, —CH$_2$CH($R^{11}$)—$R^{14}$, —CH$_2$CH$_2$CONR$^9$R$^{10}$ or —CH$_2$CH($R^{11}$)—[OCH$_2$CH($R^{11}$)]$_n$—$R^{12}$ in which
$m$ is 2 through 6;
$R^9$ and $R^{10}$ each is hydrogen or alkyl;
$R^{11}$ is hydrogen or methyl;
$R^{13}$ is lower alkanoyl, lower hydroxyalkanoylamino, lower alkoxy-lower-alkanoylamino, lower alkoxycarbonylamino, lower alkylsulfonamido, 2-pyrrolidinono, or 5-methyl-2-pyrrolidinono;
$R^{14}$ is hydroxy or lower alkoxycarbonyl;
$R^{12}$ is hydrogen or hydroxy; and
$n$ is 1 or 2.

The azo compounds which are of particular value for producing blue shades on polyester, cellulose acetate, and, especially, polyamide fibers have the formula

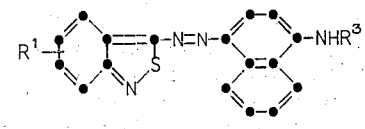

wherein
$R^1$ is hydrogen or a chlorine or bromine atom positioned at the 5- or 6-position; and
$R^3$ is —CH$_2$CH($R^{11}$)—O—[CH$_2$CH($R^{11}$)—]$_m$R$^{12}$, —(CH$_2$)$_p$NHCOR$^8$, —(CH$_2$)$_n$NHCOOR$^7$, CH$_2$CH($R^{11}$)COOR$^7$, —CH$_2$CH$_2$CONR$^9$R$^{10}$, or (CH$_2$)$_p$—$R^{13}$; in which
$R^7$ is lower alkyl;
$R^8$ is hydrogen or lower alkyl;
$R^9$ and $R^{10}$ each is hydrogen or lower alkyl;
$R^{11}$ is hydrogen or methyl;
$R^{12}$ is hydrogen or hydroxy;
$m$ is 0, 1 or 2;
$p$ is 2 or 3; and
$R^{13}$ is 2-pyrrolidinono, or 5-methyl-2-pyrrolidinono.

Our azo compounds are prepared by diazotizing an amine having the formula

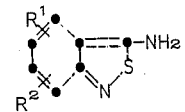

and coupling the resulting diazonium salt with a naphthylamine coupler having the structure

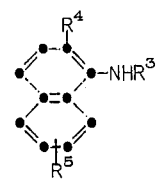

according to conventional procedures. The amine diazo precursors and the couplers are known compounds and/or can be prepared from available intermediates using known techniques. The published procedures, or minor variations thereof, employed in the synthesis of aniline couplers for azo dyes generally is applicable to the preparation of the couplers used in the synthesis of our novel compounds. The couplers also can be prepared by the Bucherer reaction utilizing available α-naphthols and amines.

Our novel azo compounds and their preparation are further described in the following examples:

EXAMPLE 1

A mixture of α-naphthol (28.8 g.), N,2-aminoethyl-pyrrolidin-2-one (76.8 g.), sodium bisulfite (20.8 g.) and water (170 ml.) is heated at 155°C. for 12 hours in an autoclave. The solid product is collected by filtration and recrystallized from 500 ml. of ethanol. There is obtained 37.4 g. of N,2(pyrrolidine-2-one)ethyl-α-naphthylamine which melts at 137°–139°C.

Anal. Calcd: C, 75.7; H, 7.2; N, 11.0. Found: C, 75.6; H, 7.2; N, 11.0.

EXAMPLE 2

To 5 ml. of concd. $H_2SO_4$ is added 0.72 g. of $NaNO_2$ portionwise below 80°C. The solution is cooled and 10 ml. of 1:5 acid (1 part propionic:5 parts acetic acid) is added below 20°C. The mixture is cooled further and 3-amino-2,1-benzisothiazole (1.5 g.) is added, followed by 10 ml. of 1:5 acid, all at 0°–5°C. The diazonium, after stirring at 0°–5°C. for 1 hour, is added to an ice-cold solution of N-(2-acetamidoethyl)-α-naphthylamine (2.3 g.) in 15 ml. of 1:5 acid, below 10°C. The pH of the coupling mixture is adjusted to Congo Red with the addition of $NH_4OAc$ and coupling is allowed 45 minutes at 10°C. The coupling mixture is drowned in water and the azo product is collected by filtration, washed with water and air-dried. The azo compound obtained imparts blue shades to nylon fibers and exhibits good fastness properties.

EXAMPLE 3

3-Amino-5-chloro-2,1-benzisothiazole (1.84 g.) is dissolved in 25 ml. of 85% $H_3PO_4$. A portion (0.72 g.) of $NaNO_2$ is added portionwise below 0°C. to the $H_3PO_4$ solution. The diazonium, after stirring at 0°C. for 2.0 hours, is added to an ice-cold solution of N-(2-carbamoylethyl)-α-naphthylamine in 15 ml. of 1:5 acid below 10°C. The pH of the coupling mixture is adjusted to Congo Red with the addition of $NH_4OAc$ and coupling is allowed 1.0 hour at 10°C. The coupling mixture is drowned in water and the product is collected by filtration, washed with water and air-dried. The azo dye obtained imparts blue shades to nylon fibers.

The azo compounds set forth in the examples of the Table conform to formula (I) and are prepared according to the procedures described hereinabove. The color given for each azo compound refers to the shade it produces on nylon 66 fibers. Examples 4 and 5 of the Table designate the structures of the azo compounds prepared in the preceding examples. The positions of the $R^4$ and $R^5$ substituents have as their reference point the group —$NHR^3$ and the azo group which are attached to the naphthalene nucleus at the 1- and 4-positions, respectively.

Table

| Example No. | $R^1, R^2$ | $R^3$ | $R^4, R^5$ | Color |
|---|---|---|---|---|
| 4 | H | —$CH_2CH_2NHCOCH_3$ | H | Blue |
| 5 | 5-Cl | —$CH_2CH_2CONH_2$ | H | Blue |
| 6 | H | —$(CH_2)_6$—$NHCOCH_3$ | H | Blue |
| 7 | H | —$CH_2CH_2CH_2NHSO_2CH_3$ | H | Blue |
| 8 | H | —$CH_2CH_2OH$ | H | Blue |
| 9 | H | —$CH_2CH_2OC_2H_4OH$ | H | Blue |
| 10 | H | —$CH_2CH_2CH_2OCH_3$ | H | Blue |
| 11 | H | —$CH_2CH_2NCH_2CH_2CH_2CO$ | H | Blue |
| 12 | H | —$CH_2CH_2OC_2H_4OC_2H_5$ | H | Blue |
| 13 | H | —$CH_2CH(OH)CH_3$ | H | Blue |
| 14 | H | —$CH_2CH(OH)CH_2OH$ | H | Blue |
| 15 | H | —$CH_2CH_2CONH_2$ | H | Blue |
| 16 | H | —$CH_2CH_2CONHCH(CH_3)_2$ | H | Blue |
| 17 | H | —$CH_2CH_2CON(C_2H_5)_2$ | H | Blue |
| 18 | H | —$CH_2CH_2CONCH_2CH_2OCH_2CH_2$ | H | Blue |
| 19 | H | —$CH_2CH_2CH_2NHCONHC_2H_5$ | H | Blue |
| 20 | H | —$CH_2CH_2CH_2NHCOCH_2OH$ | H | Blue |
| 21 | H | —$CH_2CH_2CH_2NHCOOC_2H_5$ | H | Blue |
| 22 | H | —$CH_2CH_2N(C_2H_5)SO_2CH_3$ | H | Blue |
| 23 | H | —$CH_2CH_2COOC_2H_5$ | H | Blue |
| 24 | H | —$CH_2CH_2CH_2NHCONHC_6H_5$ | H | Blue |
| 25 | H | —$CH_2CH_2CH_2OC_6H_5$ | H | Blue |
| 26 | H | —$CH_2CH_2CONCH_2CH_2CH_2CH_2CH_2$ | H | Blue |
| 27 | H | —$CH_2CH_2S$—$C=N$—$NH$—$CH=N$ | H | Blue |
| 28 | H | —$CH_2CH_2CH_2CH_2N(C_2H_5)\overset{O}{\overset{\|}{C}}$—$CH_3$ | H | Blue |
| 29 | H | —$CH_2CH_2\ CH_2NHCOCH_2Cl$ | H | Blue |
| 30 | H | —$CH_2CH_2CH_2NH\overset{O}{\overset{\|}{C}}C_6H_4$—$p$-$OCH_3$ | H | Blue |
| 31 | H | —$CH_2CH_2CH_2NH\overset{O}{\overset{\|}{C}}CH_2CH_2OCH_3$ | H | Blue |
| 32 | H | —$CH_2CH_2S$—$C=N$—$N(C_2H_5)$—$CH=N$ | H | Blue |
| 33 | H | —$C_6H_{11}$ | H | Blue |
| 34 | H | —$CH_2C_6H_{10}$—$p$-$CH_3$ | H | Blue |
| 35 | H | —$CH_2C_6H_{10}$—$p$-$CH_2OH$ | H | Blue |
| 36 | H | —$CH_2CH(OH)CH_2Cl$ | H | Blue |

Table-continued

| Example No. | $R^1, R^2$ | $R^3$ | $R^4, R^5$ | Color |
|---|---|---|---|---|
| 37 | H | —CH$_2$CH(OH)CH$_2$OCH(CH$_3$)$_2$ | H | Blue |
| 38 | H | —C$_6$H$_{10}$—p-CH$_3$ | H | Blue |
| 39 | H | —CH$_2$C$_6$H$_5$ | H | Blue |
| 40 | H | —CH$_2$C$_6$H$_4$—p-OC$_2$H$_4$OH | H | Blue |
| 41 | H | —C$_6$H$_5$ | H | Blue |
| 42 | H | —C$_6$H$_4$—p-OC$_2$H$_4$OH | H | Blue |
| 43 | H | —C$_6$H$_4$—p-OC$_2$H$_4$OCH$_3$ | H | Blue |
| 44 | H | —CH$_2$C$_6$H$_{10}$—p-CH$_2$NHCOCH$_3$ | H | Blue |
| 45 | H | —CH$_2$CH$_2$CH$_2$NHCOCH$_3$ | 7-CH$_3$ | Blue |
| 46 | H | —C$_6$H$_{11}$ | 5-OH | Green |
| 47 | H | —CH$_2$CH$_2$CH$_2$CONH$_2$ | H | Blue |
| 48 | H | —C$_6$H$_{11}$ | 2-OCH$_3$ | Blue-Green |
| 49 | H | —C$_6$H$_{11}$ | 2-CH$_3$ | Blue |
| 50 | H | —C$_2$H$_4$COOCH$_3$ | 5-NHCOCH$_3$ | Blue-Green |
| 51 | H | —C$_6$H$_{11}$ | 5-OCH$_3$ | Blue-Green |
| 52 | 5-Cl | —CH$_2$CH$_2$CH$_2$NHCOCH$_2$CH$_3$ | H | Blue |
| 53 | 5-Cl | —CH$_2$CH$_2$CH$_2$OCH$_3$ | H | Blue |
| 54 | H | —CH$_2$CH$_2$CH$_2$NCH$_2$CH$_2$CO | H | Blue |
| 55 | Cl | —CH$_2$CH$_2$CH$_2$CH$_2$OH | H | Blue |
| 56 | Cl | —CH$_2$CH$_2$C$_6$H$_5$ | H | Blue |
| 57 | Cl | —CH$_2$CH$_2$CH$_2$NHCOCH(CH$_3$)$_2$ | H | Blue |
| 58 | Cl | —CH—CH$_2$C(CH$_3$)$_2$—CH$_2$—CH(CH$_3$)CH$_2$ | H | Blue |
| 59 | Cl | —CH$_2$C$_6$H$_{10}$—p-CH$_2$NHCOOCH$_3$ | H | Blue |
| 60 | Cl | —CH$_2$CH$_2$SO$_2$CH$_3$ | H | Blue |
| 61 | Cl | —(CH$_2$)$_6$—NHCCH$_2$C$_6$H$_5$ (O) | H | Blue |
| 62 | Cl | —CH$_2$CH$_2$CN | H | Blue |
| 63 | 5-Cl | —C$_6$H$_4$—p-C$_2$H$_4$OH | H | Blue |
| 64 | 5-Cl | —CH$_2$CH$_2$CH$_2$NHCOCH$_3$ | 5-OH | Green |
| 65 | 5-Cl | —CH$_2$CH$_2$COOC$_2$H$_4$OCH$_3$ | H | Blue |
| 66 | 5-Cl | —CH$_2$CH$_2$COOCH$_2$C$_6$H$_5$ | H | Blue |
| 67 | 5-Cl | —C(CH$_3$)$_2$CH$_2$OH | H | Blue |
| 68 | 5-Br | —CH$_2$CH$_2$CH$_2$NHCOC$_2$H$_5$ | H | Blue |
| 69 | 5-Br | —CH$_2$CH$_2$OC$_2$H$_4$OH | H | Blue |
| 70 | 5-Br | —CH$_2$CH$_2$OC$_2$H$_4$CN | H | Blue |
| 71 | H | —(CH$_2$)$_3$—NCH$_2$CH$_2$CO | H | Blue |
| 72 | 6-CH$_3$ | —(CH$_2$)$_3$—NCH$_2$CH$_2$CO | H | Blue |
| 73 | 6-CH$_3$ | —CH$_2$CH$_2$CH$_2$O—m-C$_4$H$_9$ | H | Blue |
| 74 | 6-OCH$_3$ | —CH$_2$CH$_2$CH$_2$OCH$_3$ | H | Blue |
| 75 | 6-OCH$_3$ | —CH$_2$CH$_2$CONH$_2$ | H | Blue |
| 76 | 5-OCH$_3$ | —CH$_2$CH$_2$NHCOCH$_3$ | H | Blue |
| 77 | 5-CH$_3$ | —(CH$_2$)$_6$—NHCOCH$_2$CH$_3$ | H | Blue |
| 78 | 5-CH$_3$ | C$_6$H$_{11}$ | H | Blue |
| 79 | H | —C$_2$H$_4$COOCH$_3$ | 2-OC$_2$H$_5$ | Blue-Green |
| 80 | H | —C$_2$H$_4$COOCH$_3$ | 2-CH$_3$ | Blue |
| 81 | H | —CH$_2$C$_6$H$_{11}$ | H | Blue |
| 82 | H | —CH$_2$CH$_2$-N(phthalimido) | H | Blue |
| 83 | H | —CH$_2$CH$_2$NCH(CH$_3$)CH$_2$CH$_2$CO | H | Blue |
| 84 | H | —CH$_2$CH$_2$CH$_2$NHCOCH$_2$Cl | H | Blue |
| 85 | H | —CH$_2$CH$_2$CH$_2$NHCOCH$_2$CH$_2$OC$_2$H$_5$ | H | Blue |
| 86 | H | —CH$_2$C$_6$H$_{10}$—p-CH$_2$NHCOH | H | Blue |
| 87 | H | —CH$_2$C$_6$H$_{10}$—p-CH$_2$NHCOCH$_2$Cl | H | Blue |
| 88 | H | —CH$_2$C$_6$H$_{10}$—p-CH$_2$NHCOCH$_2$OH | H | Blue |
| 89 | 5-Cl | —CH$_2$C$_6$H$_{10}$—p-CH$_2$NHCOC$_6$H$_5$ | H | Blue |
| 90 | H | —CH$_2$C$_6$H$_{10}$—p-CH$_2$NHCONHC$_2$H$_5$ | H | Blue |
| 91 | H | —CH$_2$C$_6$H$_{10}$—p-CH$_2$NHCONHC$_6$H$_5$ | H | Blue |
| 92 | H | —C$_2$H$_4$OC$_2$H$_4$OH | H | Blue |
| 93 | H | —C$_2$H$_4$OC$_2$H$_4$OC$_2$H$_5$ | H | Blue |
| 94 | H | —C$_2$H$_4$OC$_2$H$_5$ | H | Blue |
| 95 | H | —CH$_2$C$_6$H$_{10}$—p-CH$_2$NHCOCH$_2$C$_6$H$_5$ | H | Blue |
| 96 | H | —CH$_2$C$_6$H$_{10}$—p-CH$_2$NHSO$_2$C$_2$H$_5$ | H | Blue |
| 97 | H | —CH$_2$C$_6$H$_{10}$—p-CH$_2$N(C$_2$H$_5$)SO$_2$CH$_3$ | H | Blue |
| 98 | H | —CH$_2$CH$_2$CH$_2$N(C$_2$H$_5$)COCH$_2$OH | H | Blue |
| 99 | H | —CH$_2$CH$_2$CH$_2$N(C$_2$H$_5$)CONHC$_6$H$_5$ | H | Blue |
| 100 | 5-Cl | —C$_2$H$_4$OCOCH$_3$ | H | Blue |
| 101 | 5-Cl | —C$_2$H$_4$OCOCH$_2$OH | H | Blue |
| 102 | 5-Cl | —C$_2$H$_4$OCOCH$_2$Cl | H | Blue |
| 103 | 5-Cl | —C$_2$H$_4$OCOC$_6$H$_5$ | H | Blue |
| 104 | H | —CH$_2$CH$_2$CH$_2$OCONHC$_2$H$_5$ | H | Blue |
| 105 | H | —CH$_2$CH$_2$CH$_2$OCONHC$_6$H$_5$ | H | Blue |

The novel azo compounds can be applied to nylon, polyester and cellulose acetate fibers according to known disperse dyeing techniques. Various dispersing and wetting agents can be employed in the dispersion of the finely divided dye compound in an essentially aqueous dyebath. Procedures by which the compounds of the invention can be applied to nylon and polyester textile materials are described in U.S. Pat. Nos. 2,880,050; 2,757,064; 2,782,187; 3,100,134 and 3,320,021. The following examples illustrate methods for applying the novel compounds to polyamide fibers and polyester fibers, respectively.

EXAMPLE 106

The azo compound (50.0 mg.) of Example 2 is dispersed in 5 cc. of 2-methoxyethanol. A small amount (3–5 cc.) of a 3% sodium lignin sulfonate solution is added, with stirring, and then the volume of the bath is brought to 150 cc. with water. A 5.0 g. textile fabric made of nylon 66 fibers is placed in the bath which is then slowly brought to the boil. The dyeing is carried out at the boil for 1 hour with occasional stirring. The dyed fabric is then removed from the dyebath, rinsed with water, and dried in an oven at 250°F. The fabric is dyed a bright shade of blue exhibiting excellent fastness properties when tested in accordance with the procedures described in the *Technical Manual of the American Association of Textile Chemists and Colorists* (AATCC), 1968 edition.

EXAMPLE 107

The azo compound of Example 3 (0.1 g.) is dissolved in 10 cc. of 2-methoxyethanol. A small amount (3–5 cc.) of a 3% sodium lignin sulfonate aqueous solution is added, with stirring, and then the volume of the bath is brought to 300 cc. with water. Three cc. of a carrier (o-phenylphenol) is added to the bath and 10 g. of a textile fabric made of poly(ethylene terephthalate) fibers is placed in the bath and worked 10 minutes without heat. The dyeing is carried out at the boil for 1 hour. The dyed fabric is removed from the dyebath and scoured for 20 minutes at 80°C. in a solution containing 1 g./liter neutral soap and 1 g./liter sodium carbonate. The fabric is then rinsed, dried in an oven at 250°F. and heat set (for removal of residual carrier) for 5 minutes at 350°C. The polyester fabric is dyed a bright blue shade which exhibits excellent fastness to light and resistance to sublimation when tested according to conventional AATCC procedures.

The compounds of the invention can also be applied to polyester textile materials by the heat fixation technique described in U.S. Pat. No. 2,663,612 and in the *American Dyestuff Reporter*, 42, 1 (1953).

As used herein, "nylon textile materials" means fibers, yarns and fabrics having a basis of a synthetic linear polyamide such as nylon 66 (polyhexamethylene adipamide) manufactured by the polymerization of adipic acid and hexamethylenediamine, nylon 6 (polycaprolactam) prepared from epsilon-aminocaproic acid lactam (caprolactam), and nylon 8. A detailed description of the synthetic polyamide materials which are dyed bright fast shades by the compounds of the invention is set forth in U.S. Pat. No. 3,100,134.

Polymeric linear polyester materials of the terephthalate sold under the trademarks "Kodel", "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. No. 2,901,466. Poly(ethylene terephthalate) polyester fibers are described, for example, in U.S. Pat. No. 2,465,319. The polymeric linear polyester materials disclosed in U.S. Pat. Nos. 2,945,010; 2,957,745 and 2,989,363, for example, can be dyed. The linear aromatic polyester materials specifically named have a melting point of at least 200°C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25°C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc.

The invention has been described in detail with particular reference to preferred embodiments thereof, but it will be understood that variations and modifications can be effected within the spirit and scope of the invention.

We claim:
1. A compound having the formula

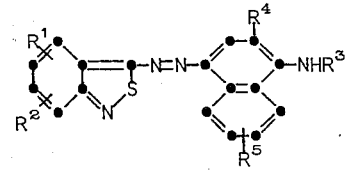

wherein
$R^1$ and $R^2$ each is hydrogen, lower alkyl, lower alkoxy, chlorine or bromine;
$R^3$ is cyclohexyl; lower alkyl cyclohexyl; aryl; alkyl of one to about six carbon atoms substituted with hydroxy, lower alkoxy, lower cyanoalkoxy, lower hydroxyalkoxy, cyano, halogen, aryl, aryloxy, cyclohexyl, lower alkylcyclohexyl, hydroxymethylcyclohexyl, $R^6$—CONHCH$_2$-cyclohexyl, $R^7$OOCNHCH$_2$-cyclohexyl, $R^7$SO$_2$N($R^8$)CH$_2$-cyclohexyl, pyrrolidinono, lower alkylpyrrolidinono, phthalimidino, —N($R^8$)CO—$R^6$, —NHCOO—$R^7$, —N($R^8$)SO$_2$R$^7$, —OOC—$R^6$, —COO—$R^7$, —CONR$^9$R$^{10}$, or —S—C=N—N($R^8$)—CH=N;

or —CH$_2$CH($R^{11}$)—[OCH$_2$CH($R^{11}$)]$_n$—$R^{12}$;
$R^4$ is hydrogen, lower alkyl or lower alkoxy; and
$R^5$ is hydrogen, lower alkyl, lower alkoxy, hydroxy, —NHCO—$R^6$, —NHCOO—$R^7$ or —NHSO$_2$—$R^7$, in which
$R^6$ is hydrogen; lower alkyl; lower alkyl substituted with halogen, hydroxy, lower alkoxy or aryl; aryl; lower alkylamino; or arylamino;
$R^7$ is lower alkyl;
$R^8$ is hydrogen or lower alkyl;
$R^9$ individually is hydrogen or lower alkyl;
$R^{10}$ individually is hydrogen or lower alkyl;

$R^9$ and $R^{10}$ in combination are pentamethylene or ethyleneoxyethylene;

$R^{11}$ is hydrogen or methyl;

$n$ is 1, 2 or 3; and $R^{12}$ is hydrogen or hydroxy; and each aryl as well as the aryl moiety of each aryloxy and arylamino is phenyl or phenyl substituted with lower alkyl, lower hydroxyalkyl, lower alkoxy, or chlorine.

2. A compound according to claim 1 wherein $R^2$, $R^4$ and $R^5$ are hydrogen; and $R^3$ is $-(CH_2)_m-R^{13}$, $-CH_2CH(R^{11})-R^{14}$, $-CH_2CH_2CONR^9R^{10}$ or $-CH_2CH(R^{11})-[OCH_2CH(R^{11})]_n-R^{15}$ in which $m$ is 2 through 6;

$R^9$ and $R^{10}$ each is hydrogen or alkyl;

$R^{11}$ is hydrogen or methyl;

$R^{13}$ is lower alkanoylamino, lower hydroxyalkanoylamino, lower alkoxy-lower-alkanoylamino, lower phenylalkanoylamino, lower alkoxycarbonylamino, lower alkylsulfonamido, 2-pyrrolidinono or 5-methyl-2-pyrrolidinono;

$R^{14}$ is hydroxy or lower alkoxycarbonyl;

$R^{15}$ is hydrogen or hydroxy; and $n$ is 1 or 2.

3. A compound according to claim 1 having the formula

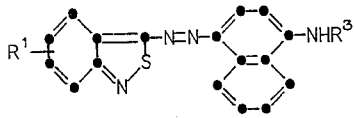

wherein $R^1$ is hydrogen or a chlorine or bromine atom positioned at the 5- or 6-position; and $R^3$ is $-CH_2{}_{CH(R^{11})}-O-[CH_2CH(R^{11})-]_mR^{12}$, $-(CH_2)_pNHCOR^8$, $-(CH_2)_nNHCOOR^7$, $CH_2CH(R^{11})COOR^7$, $-CH_2CH_2CONR^9R^{10}$, or $(CH_2)_p-R^{13}$; in which $R^7$ is lower alkyl;

$R^8$ is hydrogen or lower alkyl;

$R^9$ and $R^{10}$ each is hydrogen or lower alkyl;

$R^{11}$ is hydrogen or methyl;

$R^{12}$ is hydrogen or hydroxy;

$m$ is 0, 1 or 2;

$p$ is 2 or 3; and $R^{13}$ is 2-pyrrolidinono or 5-methyl-2-pyrrolidinono.

4. A compound according to claim 1 having the formula

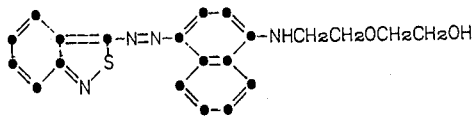

5. A compound according to claim 1 having the formula

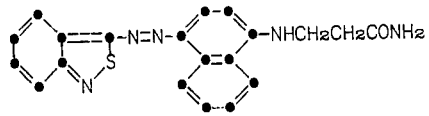

6. A compound according to claim 1 having the formula

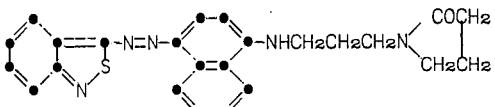

* * * * *